(12) United States Patent
Szeljack

(10) Patent No.: US 8,334,762 B2
(45) Date of Patent: Dec. 18, 2012

(54) COMMUNICATIONS ASSEMBLY ADAPTED FOR USE WITH A HELMET

(76) Inventor: Randall Gerald Szeljack, Troy, MI (US)

( * ) Notice: Subject to any disclaimer, the term of this patent is extended or adjusted under 35 U.S.C. 154(b) by 741 days.

(21) Appl. No.: 12/541,709

(22) Filed: Aug. 14, 2009

(65) Prior Publication Data

US 2010/0207758 A1 Aug. 19, 2010

Related U.S. Application Data

(60) Provisional application No. 61/091,086, filed on Aug. 22, 2008, provisional application No. 61/091,077, filed on Aug. 22, 2008.

(51) Int. Cl.
*B60Q 1/34* (2006.01)

(52) U.S. Cl. ............... 340/475; 340/497; 340/691.1; 340/693.5; 362/106

(58) Field of Classification Search ............... 340/479, 340/468, 459, 432, 467, 475, 540, 332, 691.1, 340/693.5, 425.5, 463; 180/167, 169, 244, 180/247; 362/106, 105, 464
See application file for complete search history.

(56) References Cited

U.S. PATENT DOCUMENTS

| | | | |
|---|---|---|---|
| 4,195,328 A | 3/1980 | Harris, Jr. | |
| 4,559,516 A | 12/1985 | Schott et al. | |
| 4,760,373 A | 7/1988 | Reilly | |
| 4,862,331 A | 8/1989 | Hanabusa | |
| 4,891,736 A | 1/1990 | Gouda | |
| 5,029,342 A * | 7/1991 | Stein et al. ............... 2/8.6 |
| 5,704,707 A * | 1/1998 | Gebelein et al. ............... 362/106 |
| 5,910,764 A | 6/1999 | Hayden | |
| 6,406,168 B1 | 6/2002 | Whiting | |
| 6,464,369 B1 | 10/2002 | Vega et al. | |
| 6,497,493 B1 | 12/2002 | Theisen | |
| 6,720,870 B2 | 4/2004 | Morse | |
| 6,752,510 B1 | 6/2004 | Appiah | |
| 6,784,795 B1 | 8/2004 | Pories et al. | |
| 6,914,520 B2 | 7/2005 | Chung | |
| 7,109,857 B2 | 9/2006 | Ross, Jr. et al. | |
| 7,221,263 B2 | 5/2007 | Moore et al. | |
| 7,264,368 B2 | 9/2007 | Sherring | |
| 8,157,402 B2 | 4/2012 | Huss et al. | |
| 2003/0107903 A1 | 6/2003 | Melton | |
| 2006/0293092 A1 * | 12/2006 | Yard et al. ............... 455/575.2 |
| 2007/0147027 A1 | 6/2007 | Chuang | |
| 2007/0247296 A1 | 10/2007 | Moore et al. | |
| 2007/0285221 A1 | 12/2007 | Howe et al. | |
| 2008/0084688 A1 | 4/2008 | White | |

* cited by examiner

*Primary Examiner* — Anh V La
(74) *Attorney, Agent, or Firm* — Reising Ethington P.C.

(57) ABSTRACT

A communications assembly is adapted for use with a helmet worn by a person riding a vehicle with a light indication system. The communication assembly includes a control circuit fixedly secured to the helmet. An illumination display is operatively connected to the control circuit and fixedly secured to a back surface of the helmet. The illumination display emits light rearward of the helmet. A transmitter is electrically connected to the light indication system of the vehicle for transmitting signals as a function of a status of the light indication system. A receiver is electrically connected to the control circuit for receiving the signals transmitted by the transmitter. The receiver forwards the signals onto the control circuit such that the control circuit operates the illumination display in concert with the light indication system of the vehicle. The communication assembly also includes an indicator electrically connected to the control circuit to indicate to the person of the operation of the illumination display.

17 Claims, 14 Drawing Sheets

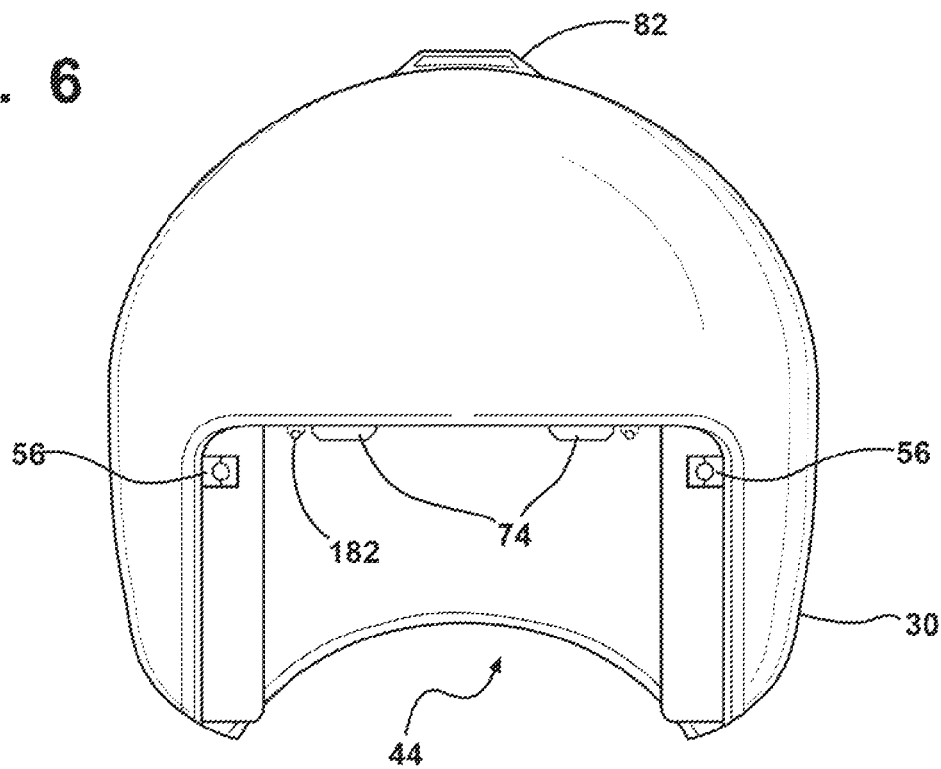
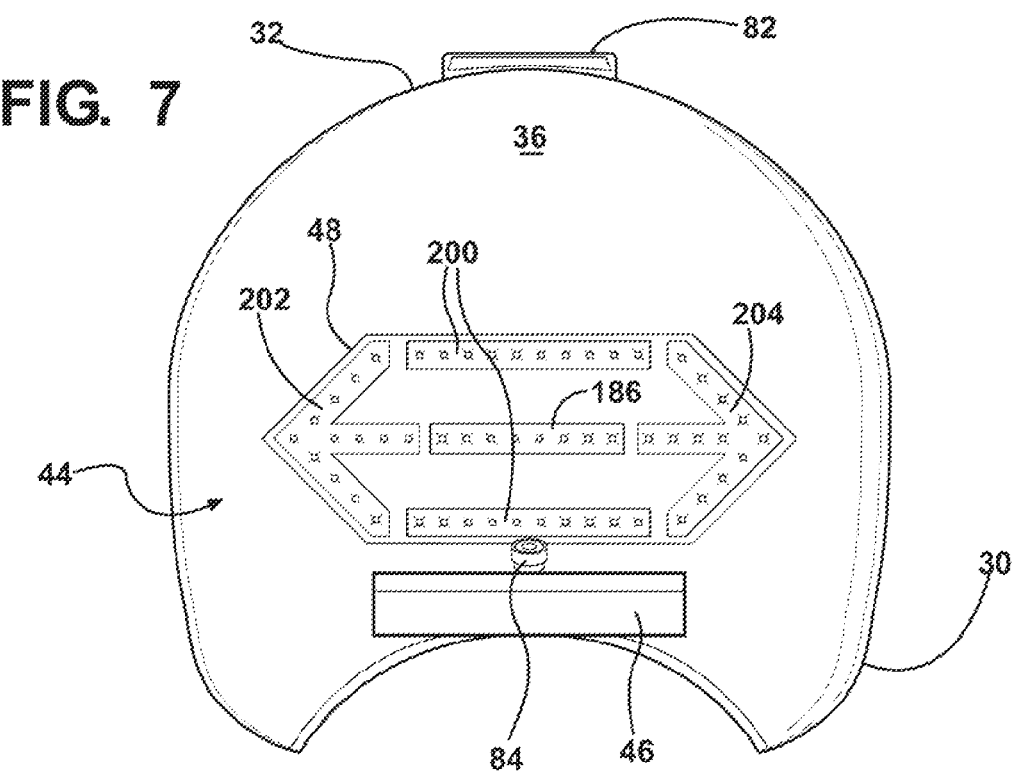

COMMUNICATIONS ASSEMBLY ADAPTED FOR USE WITH A HELMET

This patent application claims priority to U.S. Provisional Patent Applications having Ser. Nos. 61/091,077 and 61/091,086.

BACKGROUND ART

1. Field of the Invention

The invention relates to communication systems that assist others in determining how an operator of a vehicle is going to operate the vehicle. More particularly, the invention relates to a communication system adapted for use with a helmet worn by a person riding the vehicle, motorized or non-motorized.

2. Description of the Related Art

Vehicle safety helmets are mandatory for use in many states for many different types of motorized vehicles. Vehicle safety helmets with functioning running stop and turn indicators as a means of improving operator visibility and, therefore, operator safety, have been disclosed in various patents. These devices utilize remote controls such as radio frequency transmitters and receivers. Patents that disclose radio frequency transmitters and receivers include U.S. Patent application publication 2007/0285221and U.S. Pat. No. 6,784,795. Still, other safety helmets with brake in turn signal indicators operated by remote control do state that infrared transmitters and receivers could also work. Such an example is found in U.S. Pat. No. 6,720,870.

Regardless of these disclosures, there remains a need for a simple and reliable method to operate a vehicle safety helmet with running, stop and turn indicators. Improvements that will provide distinctive features, that will allow ease of use, provide reliable operation, allow monitoring of system function and have consideration for vehicle passengers is needed. Previous devices reference unique identification coding between the vehicle safety transmitters and the vehicle safety helmet receivers to ensure no crosstalk between helmets utilized by persons on one vehicle and signals being transmitted by another vehicle. These encoded communications add complexity and increase power requirements of systems.

SUMMARY OF THE INVENTION

A communications assembly is adapted for use with a helmet worn by a person riding a vehicle with a light indication system. The communication assembly includes a control circuit fixedly secured to the helmet. An illumination display is operatively connected to the control circuit and fixedly secured to a back surface of the helmet. The illumination display emits light rearward of the helmet. A transmitter is electrically connected to the light indication system of the vehicle for transmitting signals as a function of a status of the light indication system. A receiver is electrically connected to the control circuit for receiving the signals transmitted by the transmitter. The receiver forwards the signals onto the control circuit such that the control circuit operates the illumination display in concert with the light indication system of the vehicle. The communication assembly also includes an indicator electrically connected to the control circuit to indicate to the person of the operation of the illumination display.

BRIEF DESCRIPTION OF THE DRAWINGS

Advantages of the invention will be readily appreciated as the same becomes better understood by reference to the following detailed description when considered in connection with the accompanying drawings, wherein:

FIG. 6 is a front view of a helmet incorporating the invention;

FIG. 7 is a rear view of a helmet incorporating one embodiment of the invention;

DETAILED DESCRIPTION OF THE PREFERRED EMBODIMENT

In the following description terms such as below, above, front, rear, upward and the like are used solely for the purpose of clarity and illustrating the invention, and should not be taken as words of limitation. The drawings are for purposes of illustrating the invention and are not intended to be to scale.

Figure 1:
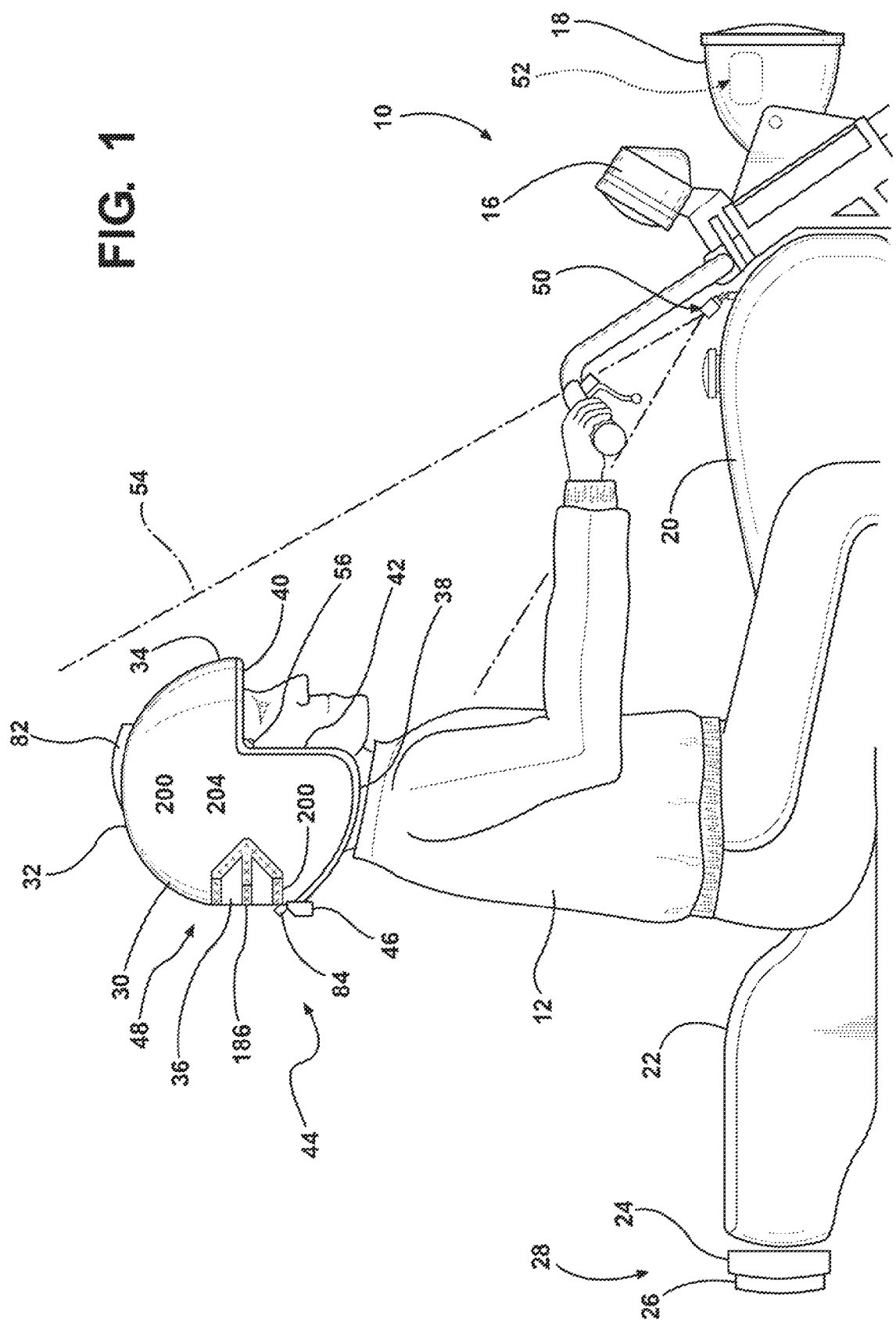
FIG. 1 is a side view of a vehicle and operator equipped with one embodiment of the invention.

Referring to FIG. 1, a partially cutaway vehicle 10 has a rider 12 disposed thereon. The rider 12 is operating the vehicle 10. In FIG. 1, the vehicle 10 is depicted as a motor vehicle and, more specifically, a motorcycle. It should be appreciated by those skilled in the art that the vehicle 10 may or may not be motorized. The vehicle 10 may be a bicycle, tricycle, recumbent tricycle, an all terrain vehicle, and the like. The vehicle 10 shown in FIG. 1 includes handlebars 14, instrumentation 16, a headlamp 18, a gas tank 20, and a seat 22.

Figure 2:
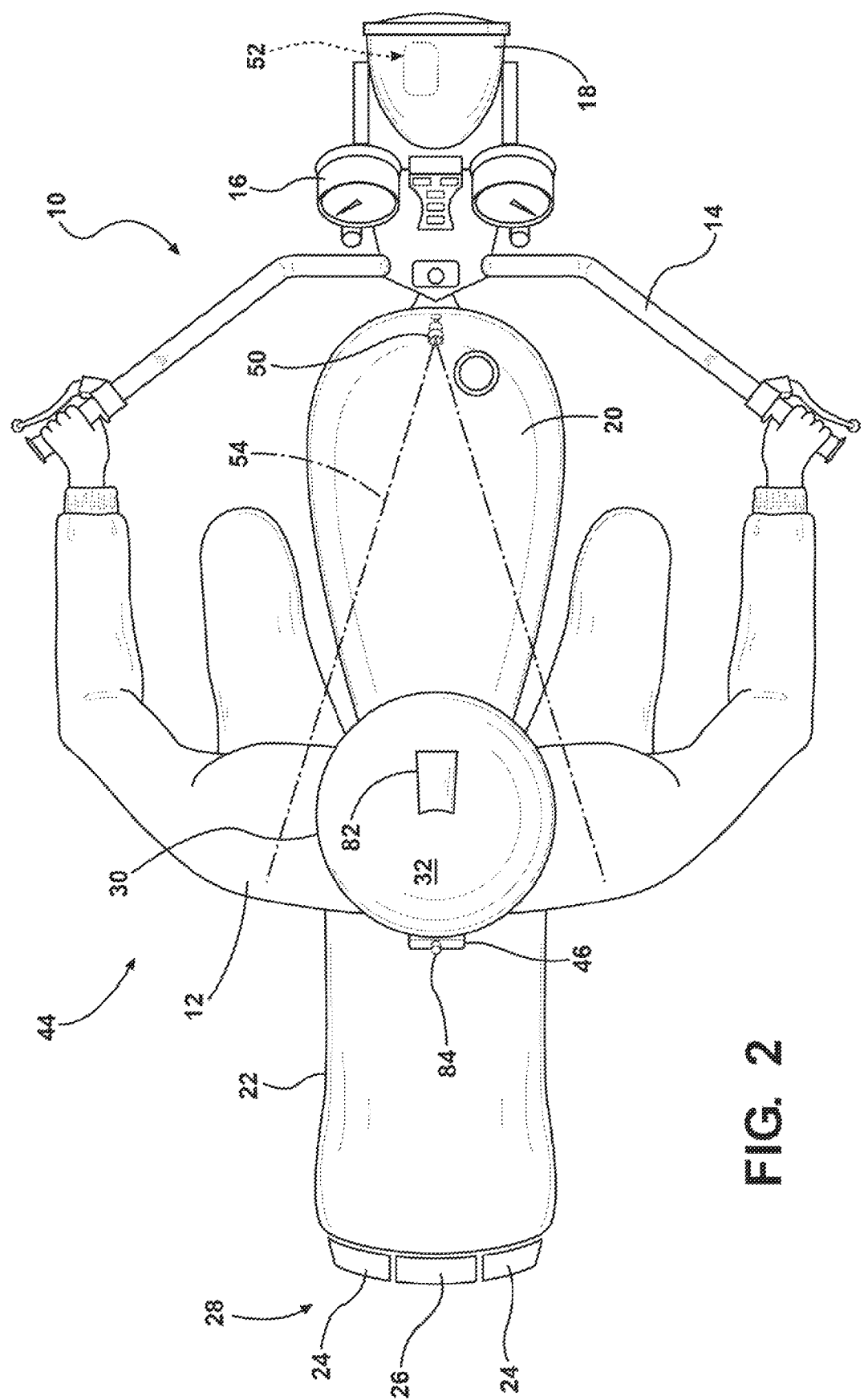
FIG. 2 is a top view of a vehicle and operator equipped with the invention.
Figure 3A:
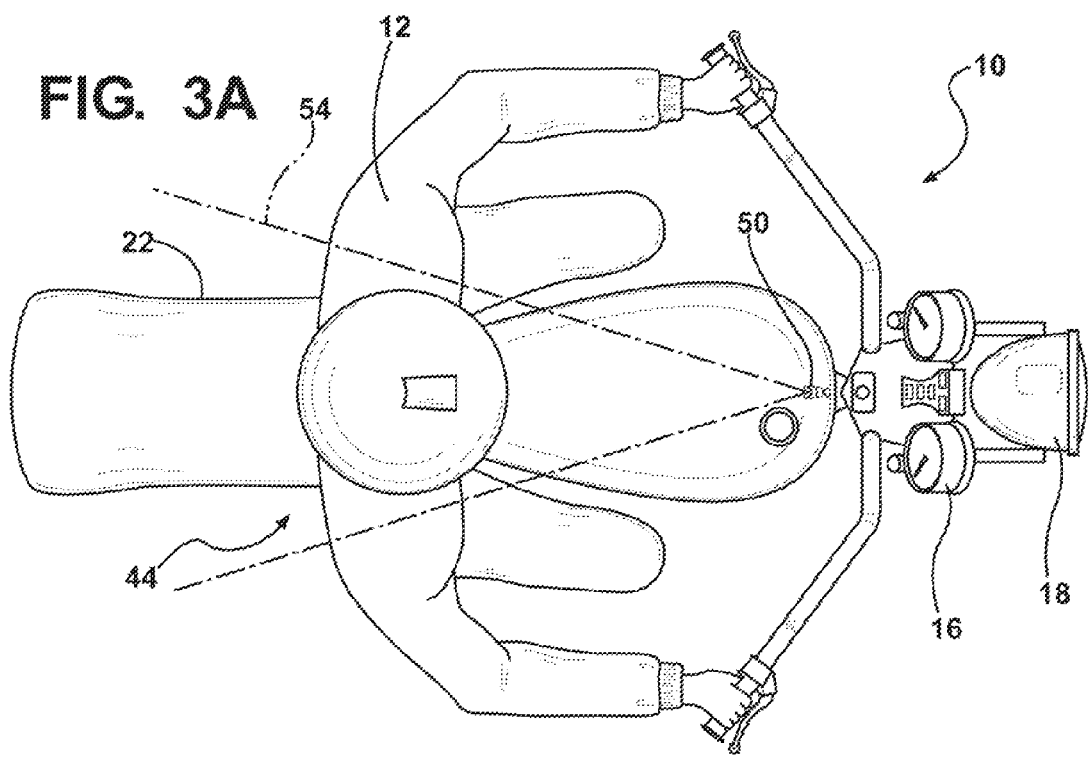
FIGS. 3a and 3b are top and side views, respectively, of a vehicle and operator incorporating the invention therein.
Figure 3B:
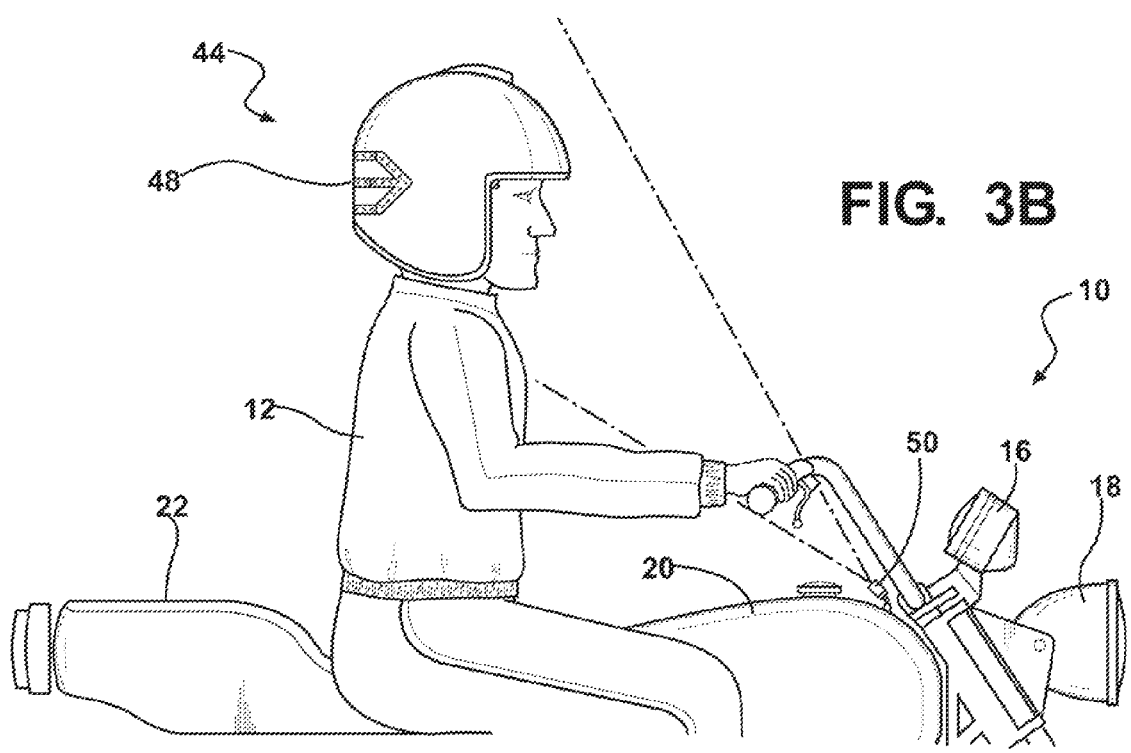

Referring to FIG. 2, the vehicle 10 includes turn signals 24 and a brake light 26. The turn signals 24 and brake light 26 constitute a light indication system, generally shown at 28 of the vehicle 10. It should be appreciated by those skilled in the art that the turn signals 24 are also visible from the front of the vehicle 10 although they are not shown in the FIGS.

The rider 12 shown in FIGS. 1 and 2 is the person operating the vehicle 10. The rider 12 is wearing a helmet 30. The helmet 30 has a top 32, a front 34, a back surface 36 and a bottom edge 38. The helmet 30 also includes a visor edge 40 and two ear protections edges 42. It is contemplated that the helmet 30 is constructed in a manner recognized as appropriate for the vehicle 10 being ridden. The helmet 30 may include the components discussed herein or may be missing one or more elements. Variations of the construction of the helmet 30 do not change or alter the scope of the invention described herein.

The invention, a communications assembly, is generally indicated at 44. The communications assembly 44 is adapted to be used with the helmet 30 worn by the person 12 riding the vehicle 10 with the light indication system 28.

The communications assembly 44 includes a control circuit, generally indicated at 46, that is fixedly secured to the helmet 30. The control circuit 40 will be described in greater detail subsequently with reference to different Figures. The communications assembly 44 also includes an illumination display 48 which is operatively connected to the control circuit 46 and fixedly secured to the back surface 36 of the helmet 30. The illumination display 48 emits light rearward of the helmet 30 so that it is visible by those that are following or behind the vehicle. The illumination display 48 is illuminated during actions such as turning, in unison with the turn signals 24, braking, in unison with the brake light 26, or a "hazard" situation wherein the left and right turn signals of the illumination display 48 are illuminated in a flashing manner.

The communications assembly 44 also includes a transmitter 50 that is electrically connected to the light indication system 28 of the vehicle 10. The transmitter 50 transmits signals as a function of the status of the light indication system 28. A transmitter circuit and housing 52 is shown mounted to the headlamp of the vehicle 10. It should be appreciated by those skilled in the art that the transmitter circuit and housing 52 may be mounted anywhere convenient so that it could receive signals from the wire harness dedicated to the light indication system 28 and obtain power through the power system of the vehicle 10 should the vehicle 10 have a power system. The transmitter 50 transmits signals through a field of view, graphically represented by a cone 54 designed to encompass the helmet 30. The transmitter 50 transmits its signals in an infrared region of the electromagnetic spectrum. This allows the signals to be directed toward the head of the person 12 wearing the helmet 30 without damaging the person's eyes or obscuring the person's vision. The transmitter 50 may be pivotally adjusted depending on the height of the rider 12.

Figure 4C:
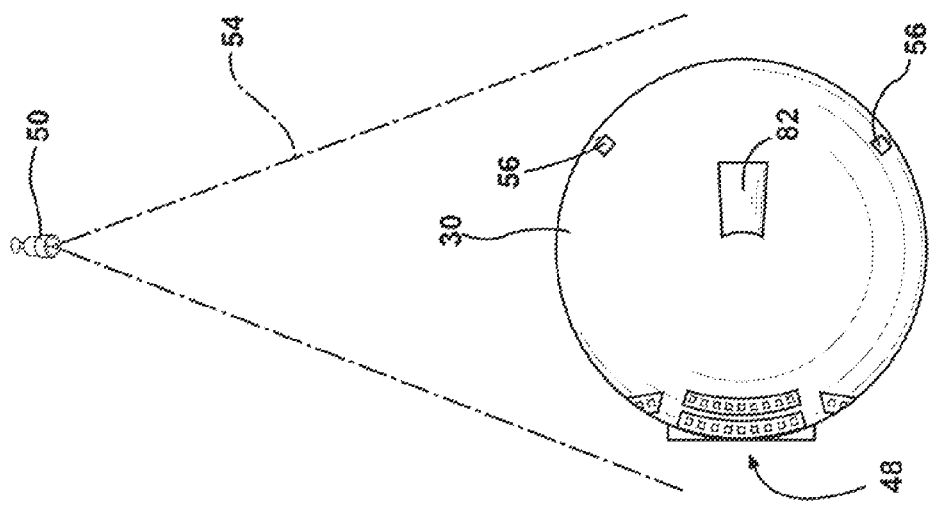
FIGS. 4a through 4c are schematic representations of a helmet in various orientations with respect to a transmitter.
Figure 4B:
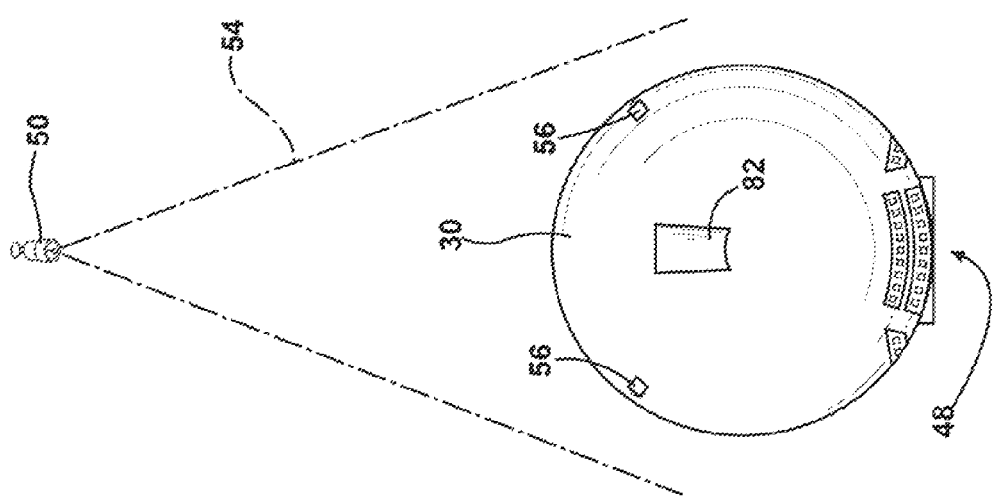
Figure 4A:
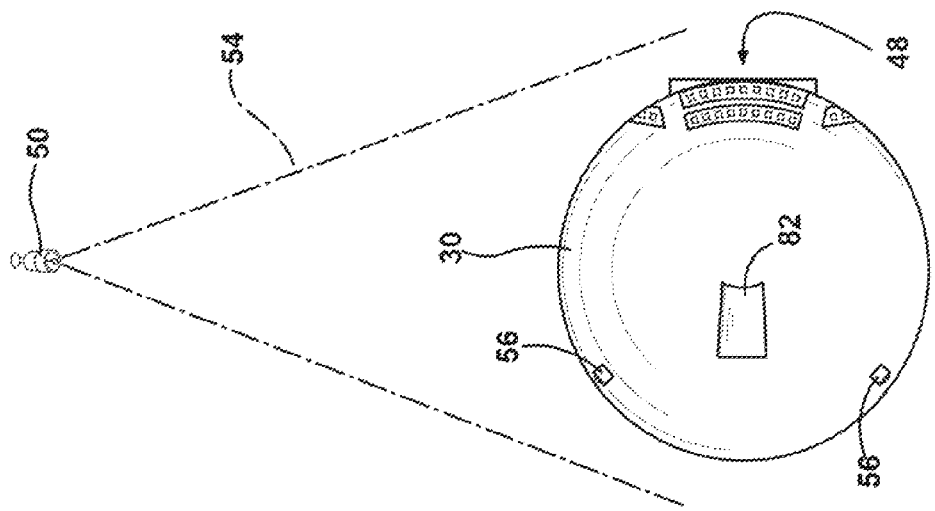

The communications assembly 44 includes a receiver 56 (one shown in FIG. 1). The receiver 56 is electrically connected to the control circuit 46 and receives the signals transmitted by the transmitter 50. The receiver 56 forwards the signals onto the control circuit 46 such that the control circuit 46 operates the illumination display 48 in concert with the light indication system 28 of the vehicle 10. Referring to FIGS. 4a through 4c, it is shown that there are two receivers 56 on the helmet 30 each positioned along the visor edge 40 near each of the ear protection edges 42. This allows the rider 12 to turn his or her head to the left and to the right and still have one of the receivers 56 within the field of view of the transmitter 50 such that communication between the transmitter 50 and the receiver 56 will never be lost based on the orientation of the helmet 30. Even if the helmet 30 were to be turned in such a fashion that a line of sight between the transmitter and both receivers 56 is broken, it could only be for a brief moment in time as the rider 12 would generally have to be looking forward of the vehicle 10 requiring the helmet 30 to return to a position where at least one of the receivers 56 is in the field of view cone 54 of the transmitter 50.

Figure 5B:
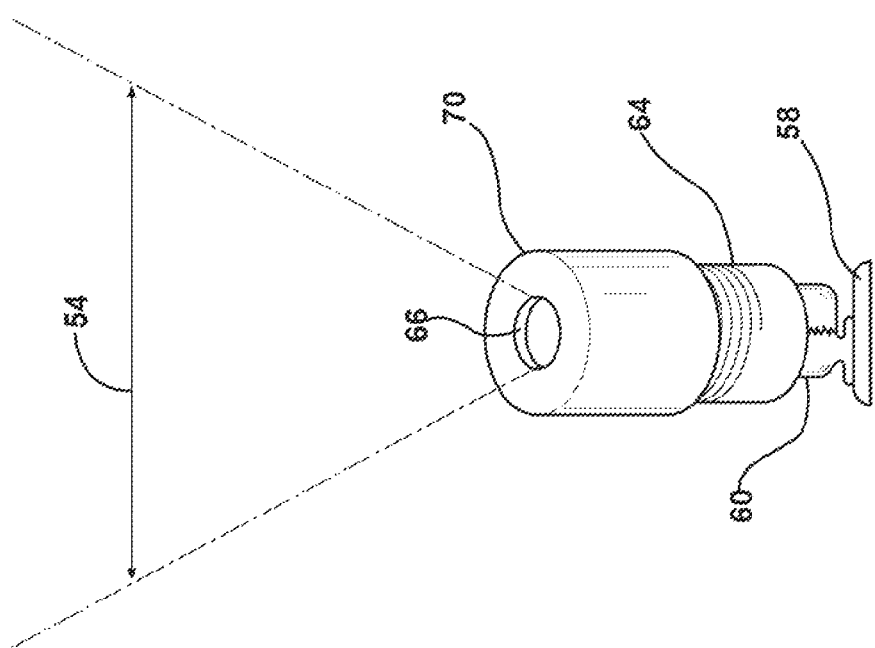
FIG. 5b is a side view of one embodiment of the transmitter.
Figure 5A:
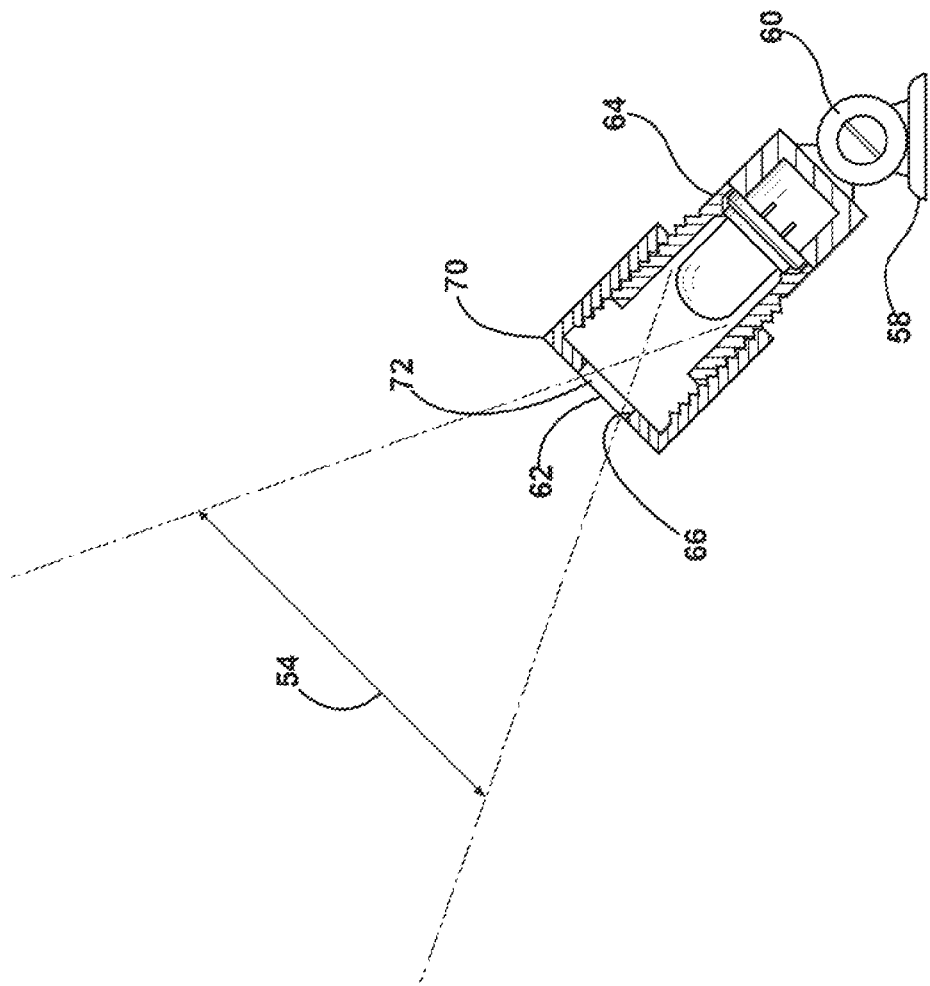
FIG. 5a is a cross-sectional side view of one embodiment of a transmitter.

Referring to FIGS. 5a and 5b, the transmitter 50 is shown. The transmitter 50 includes a base 58 that is fixedly securable to a structure on a vehicle. In the embodiment shown in the Figures, the structure is the gas tank 20. A pivot 60 allows a transmitting light source 62 to be positioned relative to the base 58. The transmitting light source 62 is a light emitting diode (LED) as is well known in the art. The transmitting light source 62 is surrounded by a lower housing 64 that defines an aperture 66. An upper housing 68 is threadingly engagable with a lower housing 64. The upper housing 68 defines an upper aperture 70 that together with the aperture 66 of the lower housing 64 define the cone or field of view 54. The lower housing 64 and the upper housing 68 combine to create a focusing device that is used to direct the signals toward the receiver 56. A lens 72 may be used to seal the upper aperture 70 or further focus the field of view 54 of the transmitting light source 62. Raising or lowering the upper housing 68 with respect to the lower housing 64 adjusts the field of view 54. By adjusting the field of view of the transmitter 50, the need for encoding the signal being transmitted is eliminated because the field of view restriction of the cone 54 prevents the signal from being received by others on vehicles nearby.

Figure 8:
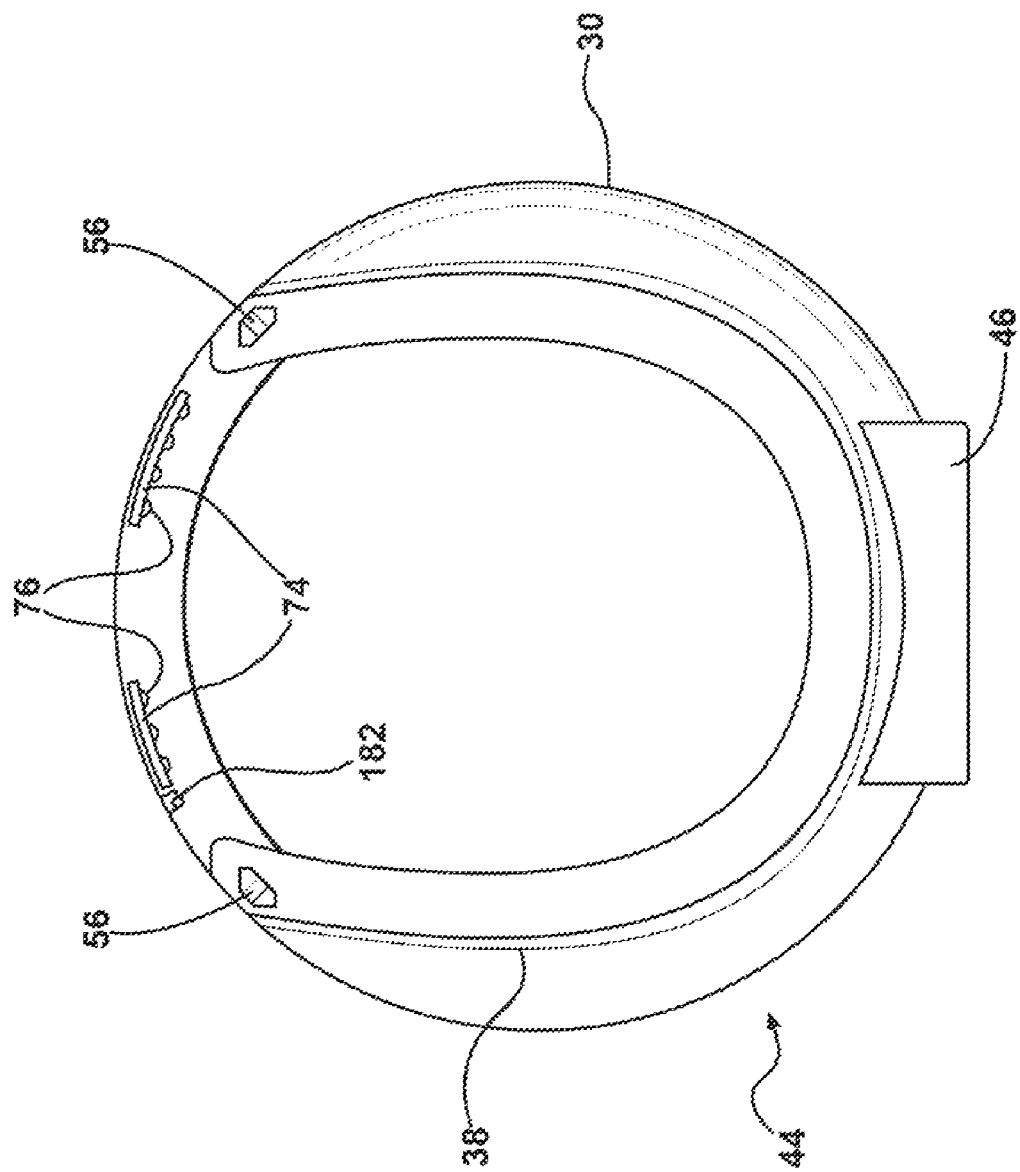
FIG. 8 is a bottom view of a helmet incorporating the invention.

Referring to FIG. 8, the communication assembly 44 includes an indicator, generally indicated at 74, that is electrically connected to the control circuit 46 to indicate to the person 12 of the operation of the illumination display 48. In the preferred embodiment, the indicator 74 is an array of lights 76 mounted near the visor edge 40 that are illuminated in the same manner that the illumination display 48 is illuminated. By way of example, the leftmost light in the array of lights 76 indicates that the left hand turn signal has been activated on the illumination display 48. This will allow the rider 12 of the vehicle 10 to know that the left turn signal is operating and that it is on until the leftmost light in the array of lights 76 is extinguished. Each of the lights in the array of lights 76 indicates a particular signal or condition. These conditions include left hand turn, stop, right hand turn, running lights, battery condition and signal strength. This list is disclosed herein for purposes of showing examples of what the rider 12 of the vehicle 10 would want to see based on the operation of the communications assembly 44. It should be appreciated by those skilled in the art that the rider 12 may desire to see other types of indications and as such would be included in the indicator 74.

The array of lights 76 is a plurality of lights and it is fixedly secured to the helmet 30 in a position peripheral of the person's vision. As shown in FIG. 8, the plurality of lights 76 is disposed on the visor edge 40 of the helmet 30. Design choices may require that the indicator be placed in positions other than what is shown in FIG. 8 as the positioning of the indicator 74 is only shown by way of example.

Figure 12C:
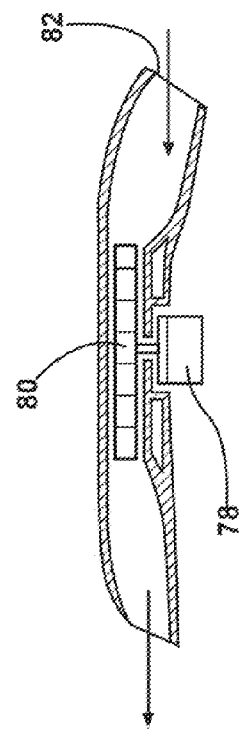
FIGS. 12a through 12c represent side and top views of a generator utilized by the control circuit of the invention.
Figure 12B:
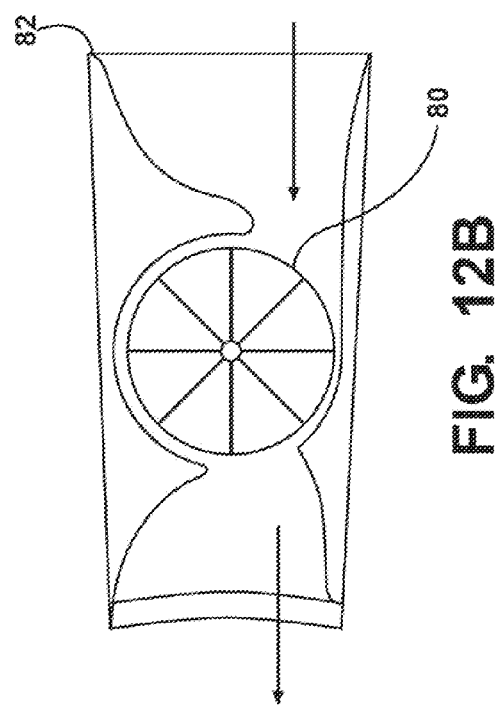
Figure 12A:
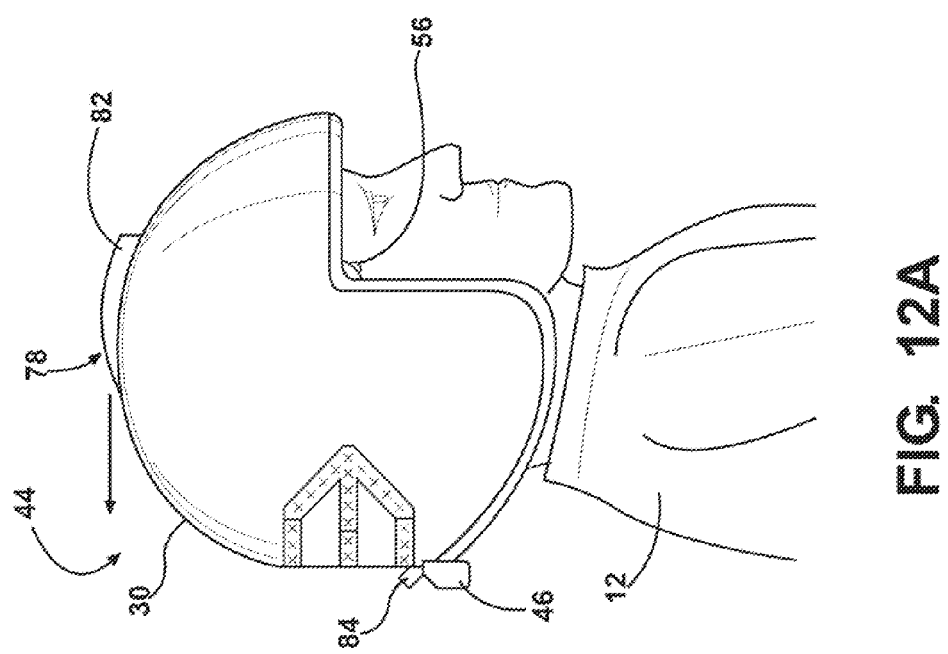

Referring to FIGS. 12a through 12c, the helmet 30 is shown to have a generator 78 electrically connected to the control circuit 46 and mounted to the helmet 30 for generating an electric current to be consumed by the control circuit 46 and the illumination display 48. The generator 78 includes a turbine 80 that turns when air flows therepast which turns the generator 78 to generate the electricity to be consumed by the control circuit 46 and the illumination display 48. The turbine 80 is affixed to the top 32 of the helmet 30 and includes a turbine housing 82 that directs airflow using a directional neck 83 such that the turbine 80 turns in a single direction. The turbine housing 82 is designed to be aerodynamic such that it does not produce a large amount of drag so that the rider 12 does not feel the helmet 30 pulling back on the rider 12.

Figure 13:
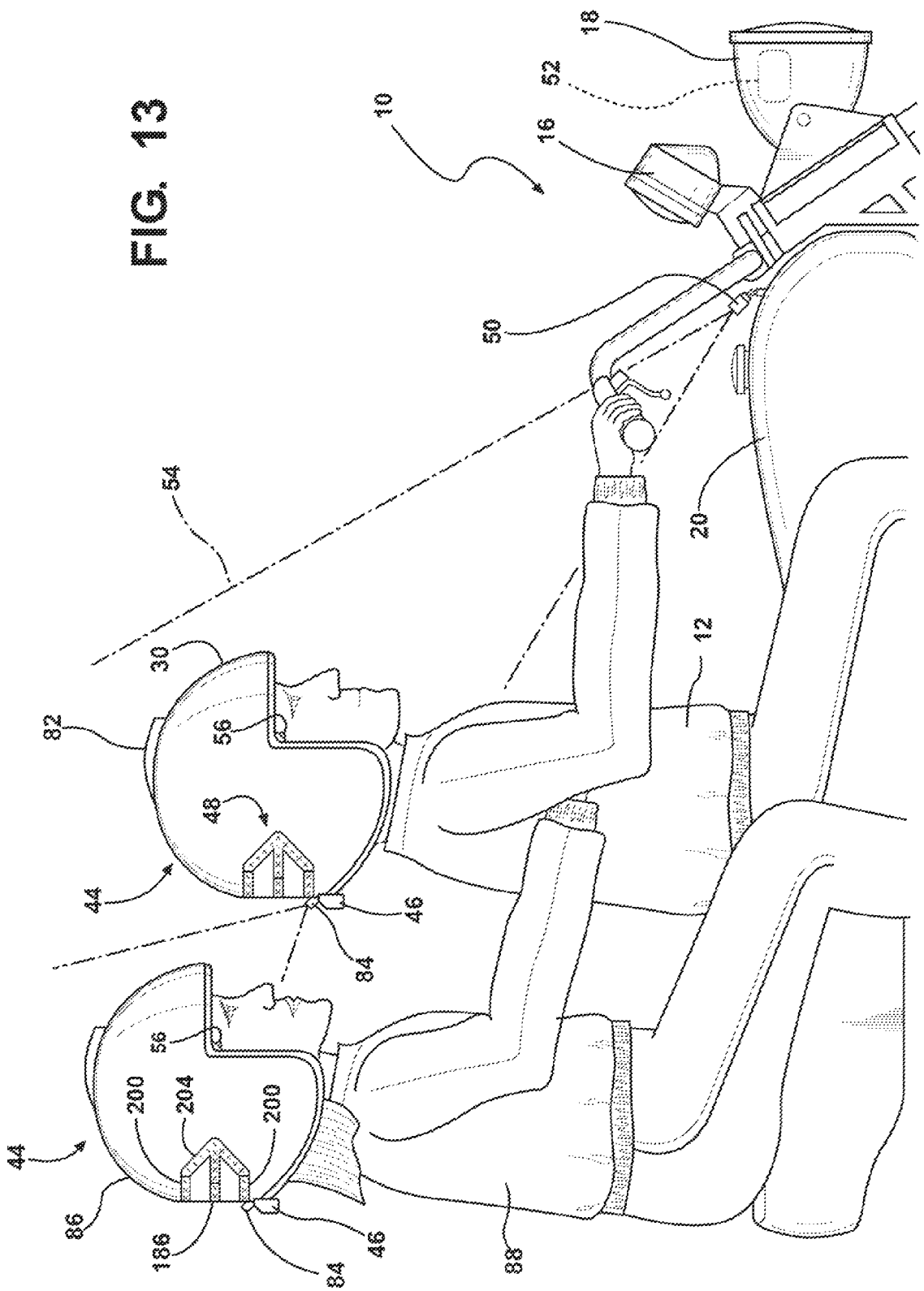
FIG. 13 is a side view of two people riding a vehicle wearing helmets incorporating the invention.
Figure 14:
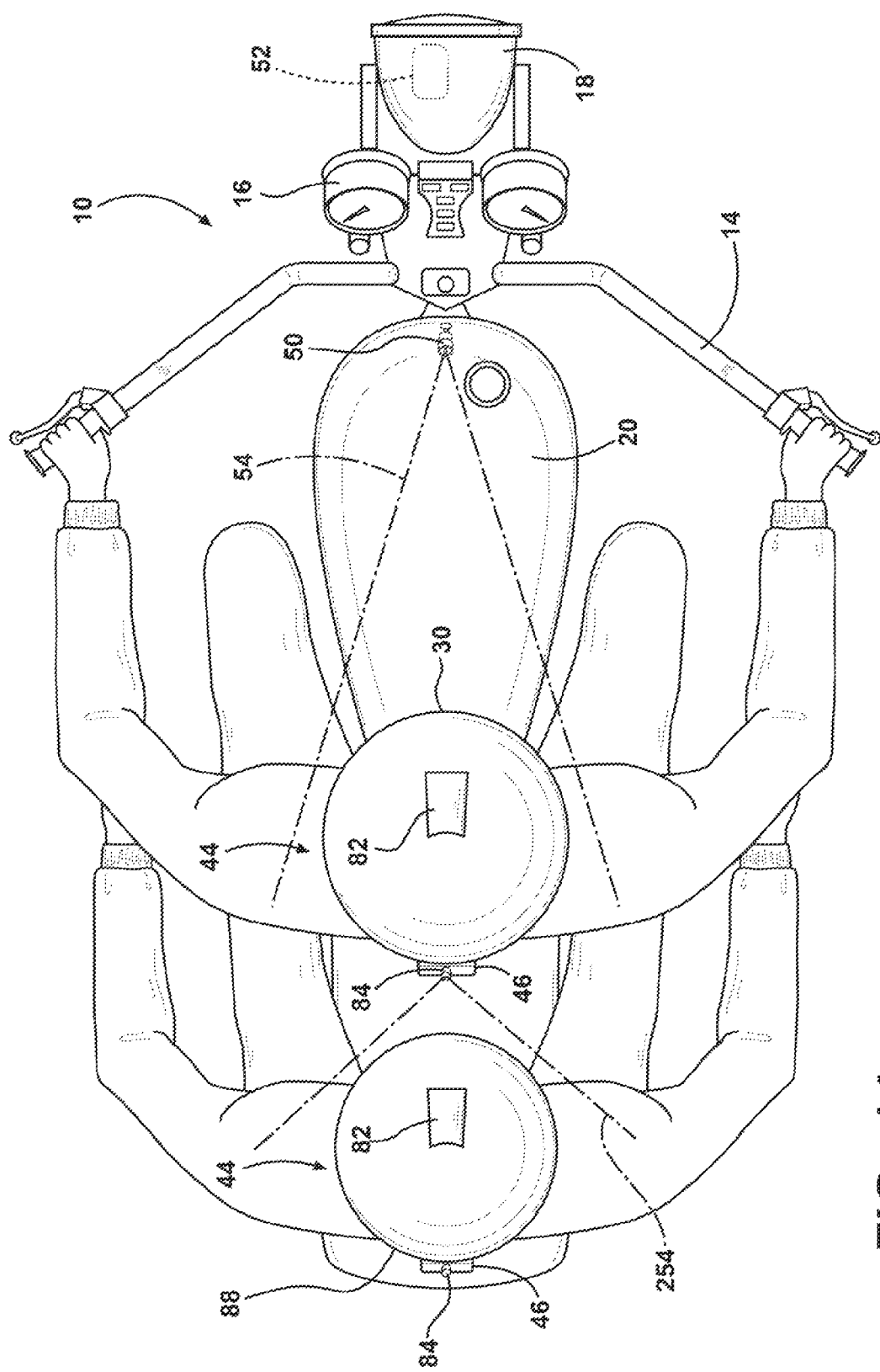
FIG. 14 is a top view of FIG. 13.

Referring to FIG. 13, the communications assembly 44 is shown to include a retransmitting transmitter 84. The retransmitting transmitter 84 maybe disposed adjacent the control circuit 46. The retransmitting transmitter 84 is fixedly secured to the back surface 36 of the helmet for retransmitting the signals received by the receiver 56. The retransmitting transmitter 84 retransmits the signal rearward thereof to be received by a passenger helmet 86 positioned behind the helmet 30. The passenger helmet 86 is identical to the helmet 30 discussed above but for the fact that the passenger helmet 86 is, by definition, always disposed behind another helmet 30, presumably worn by the driver of the vehicle. A passenger 88 will obstruct the display created by the illumination display 48 of the helmet 30. Therefore, the passenger helmet 86 must be able to receive a signal so that it could illuminate its illumination display 90 in a manner commensurate with how the illumination display 48 of the helmet 30 would have been seen by those behind the vehicle 10. The person 12 operating the vehicle 10 will, however, obstruct the view of the transmitter 50. Therefore, the retransmitting transmitter 84 in the helmet 30 sends an identical signal as that generated by the transmitter 50 to the receiver 92 of the passenger helmet 86. In this way, the illumination display 90 of the passenger helmet 86 will operate as if it were the only helmet being worn by persons on the vehicle 10 such that it will illuminate its illumination display 90 as if it were the only helmet, such as the helmet 30 operating when only one person 12 is on the vehicle 10.

Figure 15B:
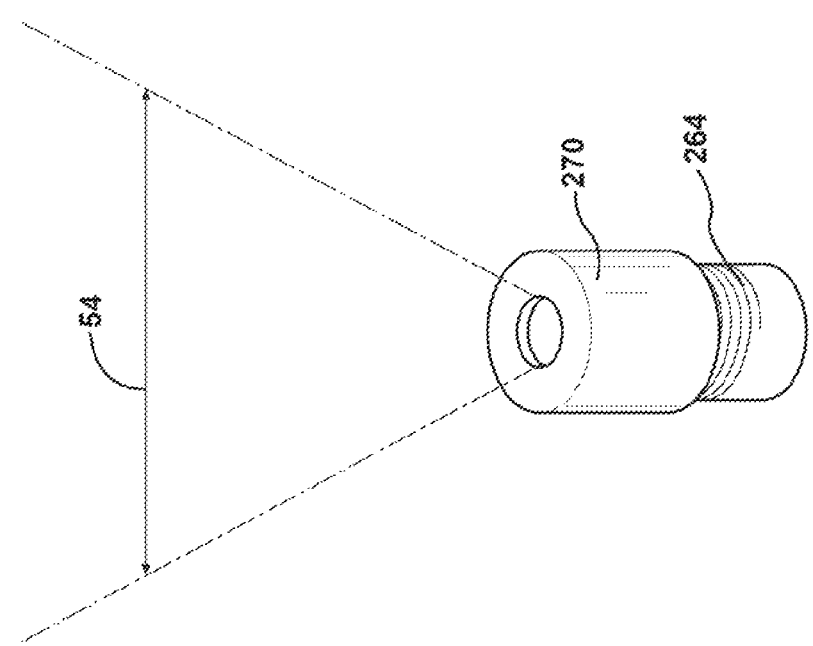
FIG. 15b is a side view of a retransmit transmitter incorporated by the invention.
Figure 15A:
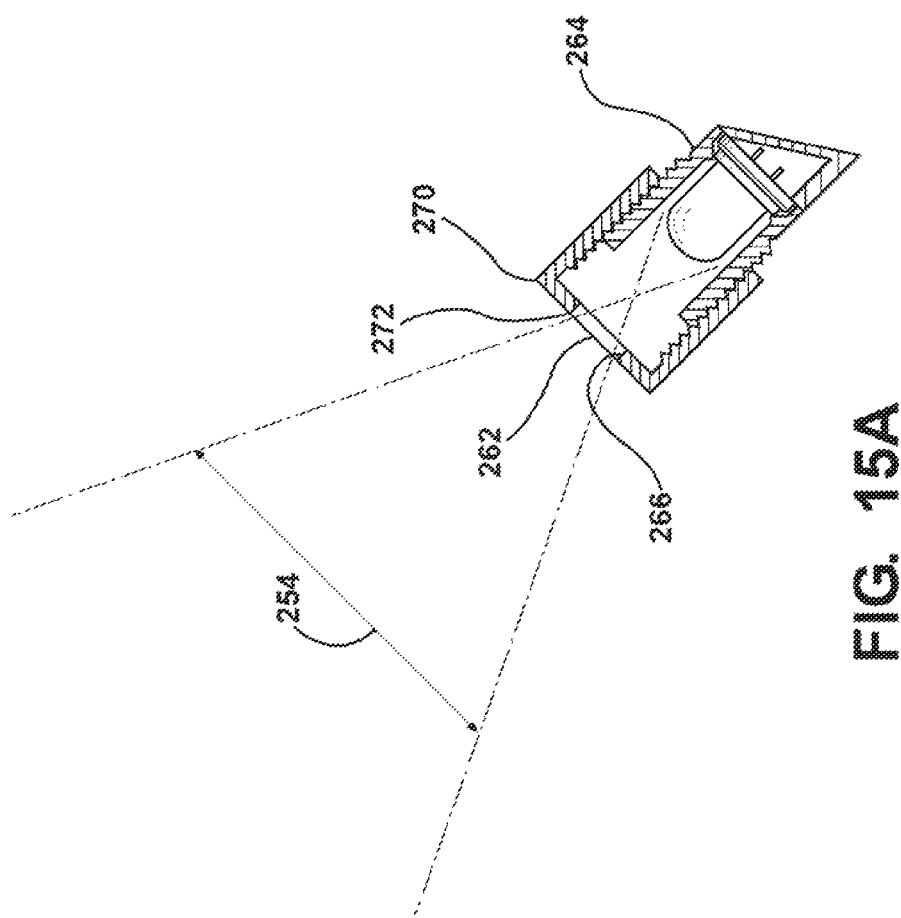
FIG. 15a is a cross-sectional side view of a retransmit transmitter utilized by the invention.

Referring to FIGS. 15a and 15b, the retransmitting transmitter 84 is shown in detail. Its component parts are similar to the component parts of the transmitter 50, wherein the reference numerals for the components of the retransmitting transmitter 84 are offset by 200 from those of the transmitter 50.

The communications assembly 44 also includes a passenger mode switch 94 (FIG. 11) which will turn the illumination display 48 of the helmet 30 off when the passenger helmet 86 is disposed behind the helmet 30. This way, the passenger 88 does not have to be blinded by the illumination display 48 of the person 12 in front of the passenger 88. This illumination switch 94 may be a manual switch or, in the alternative, it may be an automatic switch designed to turn off the illumination display 48 when a passenger helmet 86 is detected as receiving the retransmitting transmitter signal.

Figure 9:
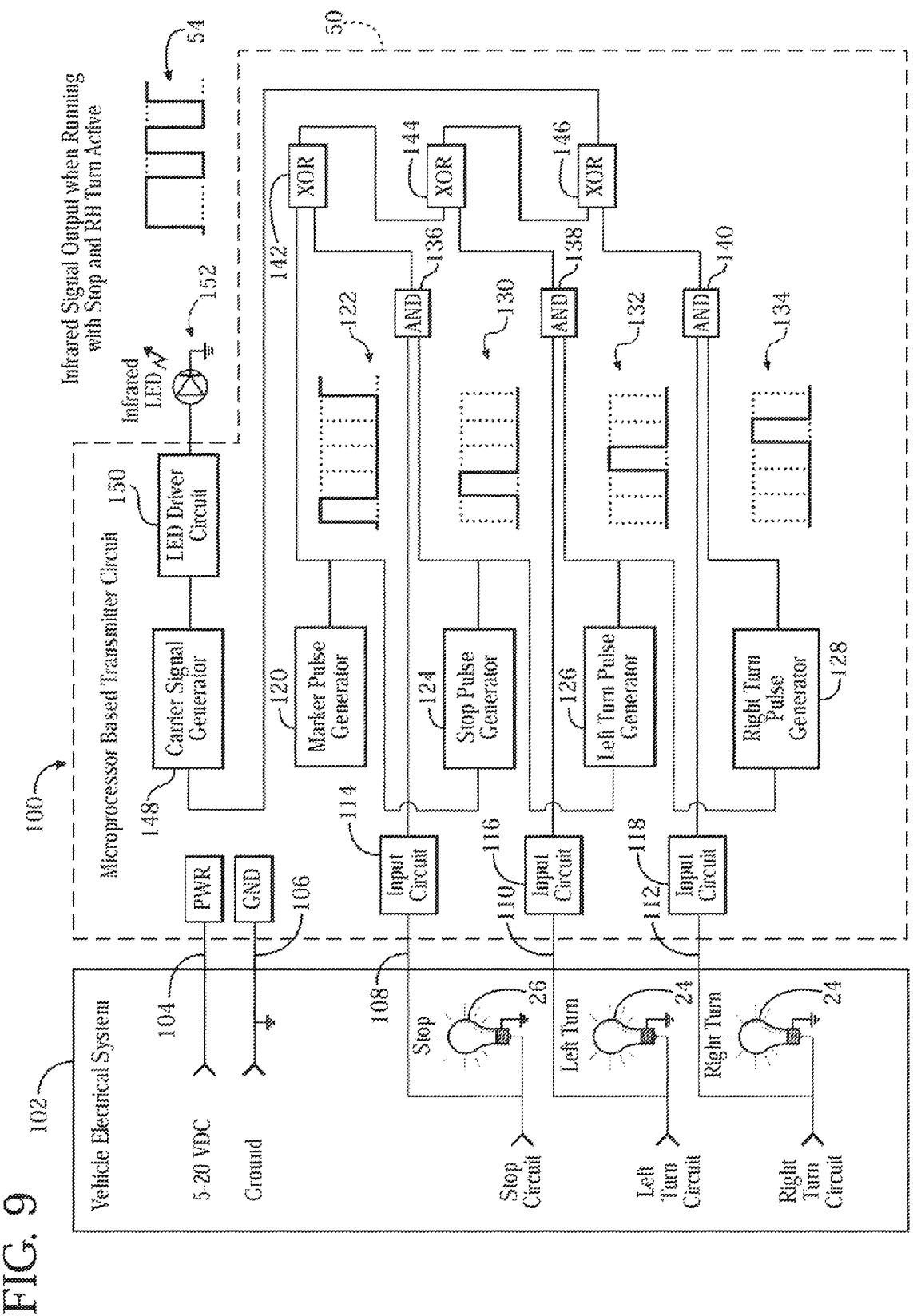
FIG. 9 is a schematic view of a block circuit diagram for the control circuit.
Figure 10:
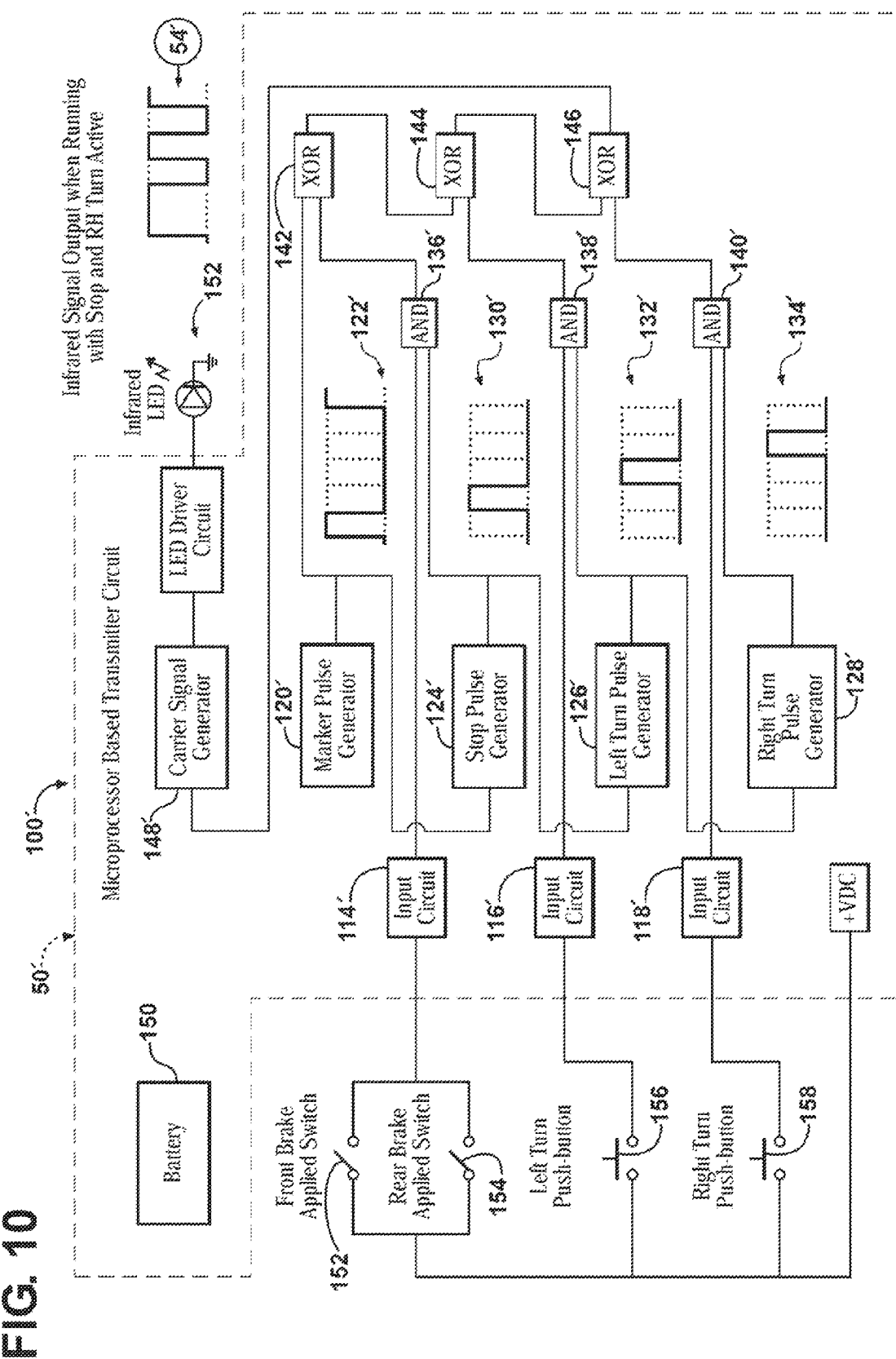
FIG. 10 is a block diagram of a transmitter for a non-motorized vehicle.
Figure 11:
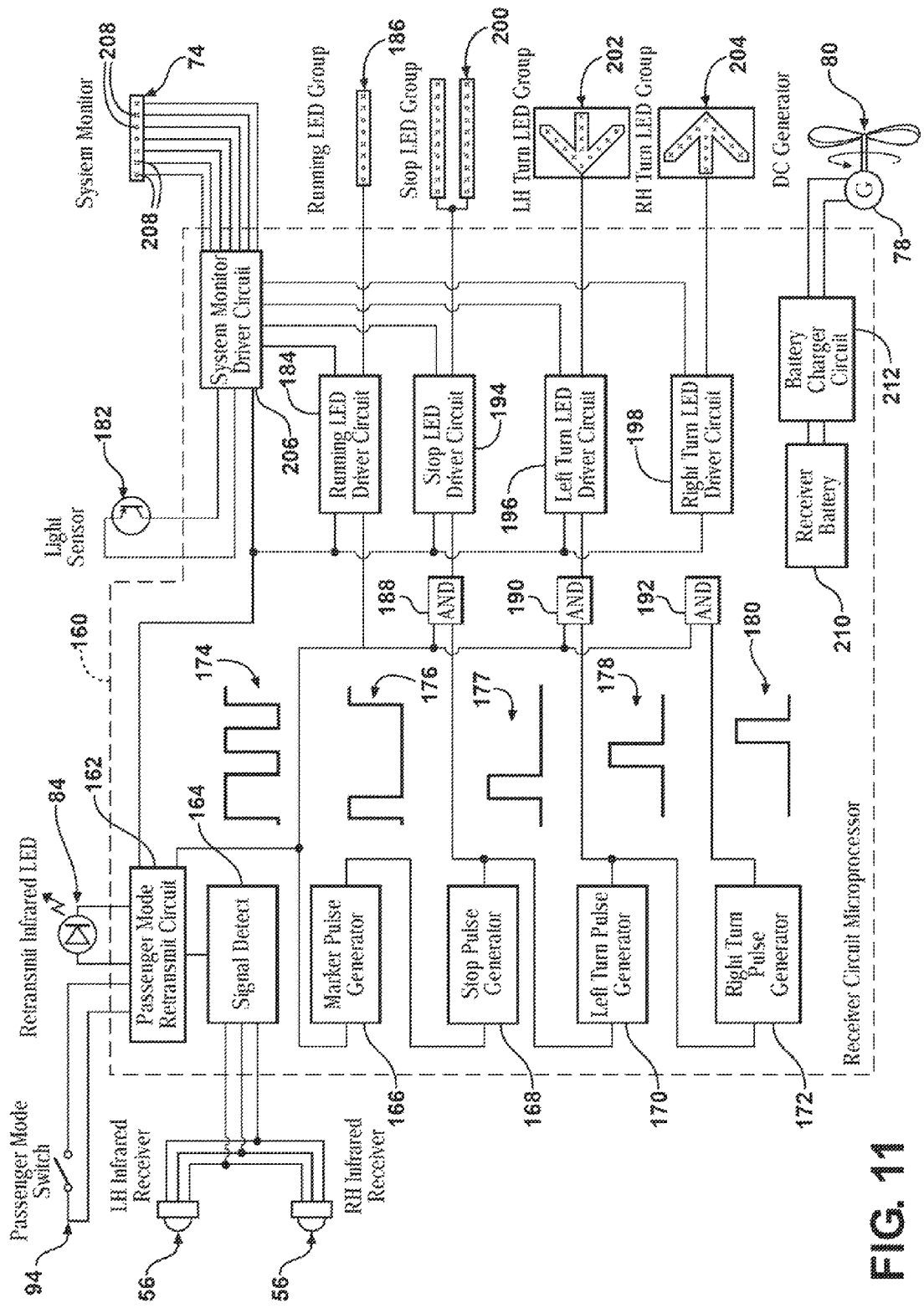
FIG. 11 is a block diagram for the receiver.

Referring to FIGS. 9 through 11, block diagrams of the circuits used to create the communications assembly 44 are generally shown. Referring specifically to FIG. 9, a block diagram of the transmitter 50 when the transmitter 50 is electrically connected to a motor vehicle is generally indicated at 100. The transmitter 50 is connected to the vehicle electrical system 102. The vehicle electrical system 102 provides power through a terminal 104, a ground through a terminal 106 and inputs through terminals 108, 110, 112, which relate to the brake light 26 and turn signals 24 for the left turn and right turn signals, respectively. The transmitter 50 includes three input circuits 114, 116, 118 that correlate to the terminals 108, 110, 112, respectively. The transmitter 50 includes a marker pulse generator 120. The marker pulse generator 120 creates a carrier signal 122 shown in the Figure as a simple pulse or step signal. Such representation of the signal as a step or pulse signal is done for purposes of simplifying the drawing. The transmitter 50 also includes a stop pulse generator 124, a left turn pulse generator 126 and a right turn pulse generator 128. Each of these pulse generators 124, 126, 128 generates their respective signals 130, 132, 134. Outputs from the input circuits 114, 116, 118 and outputs from the stop pulse generator 124, the left pulse generator 126, and the right turn pulse generator 128 are combined through logic AND gates 136, 138, 140. The outputs from the AND gates 136, 138, 140 are sent through three XOR gates 142, 144, 146. The output from the final XOR gate 146 is sent to a carrier signal generator 148. The output of the carrier signal generator 148 is received by an LED driver circuit 150 which, in turn, powers the LED 152 that transmits the signal (represented by the cone 54 in several of the Figures).

Now referring to FIG. 10, wherein like prime numerals represent similar components and/or signals, the transmitter 50' is shown here connected to a vehicle 10 that does not have power, nor does it generate power. The transmitter 50' includes a battery 150 that provides the power thereto. A front brake switch 152, a rear brake switch 154, a left turn push button 156 and a right turn push button 158 are all secured to the vehicle allowing the operator of the vehicle to electrically indicate whether the brakes are being applied or the operator is going to turn the vehicle left or right. It is contemplated that the two brake switches 152, 154 are tied directly to the brakes of the vehicle in one fashion or another. This way, the operator of the vehicle does not have to activate two switches per brake. All of these inputs are received by the transmitter 50' through input circuits 114', 116', and 118'. Once the input circuits 114', 116' and 118' receive the signals from the various input devices 152, 154, 156, 158, the circuit operates as it was discussed above with reference to FIG. 9.

Referring to FIG. 11, the receiver is generally shown at 56. Two infrared receivers 56 are shown as per the discussion above. The receiver 56 sends the signals along to the receiving circuit 160. If the passenger mode switch 94 is closed, a passenger mode retransmit circuit 162 passes the signal as it is received from the transmitter 50, 50' through the receivers 56 onto the retransmitting transmitter 84 to be received by a receiver 56 on a passenger helmet 86 as if the helmet 30 did not exist.

If the passenger mode switch 94 is not closed, the signal is received by a signal detector 164 where it is passed along to a marker pulse generator 166, a stop pulse generator 168, a left turn pulse signal generator 170 and a right turn pulse generator 172. Each of these generators 166 through 172 generates signals graphically depicted at 174 through 180. A running LED driver circuit 184 illuminates a center group of LEDs that run horizontal through the illumination display 48. The running LED group 186 will be illuminated through many instances when operating the illumination display 48 of the helmet 30. The running LED group 186 may also be illuminated at varying intensity levels, depending on the operation of the various input circuits 114, 116, 118 and/or the various switches 152, 154, 156, 158. The running LED group 186 may also vary in intensity based on ambient light. More specifically, the running LED group 186 may have less intensity when it is dark out and more intensity when it is light. The light levels of ambient light are measured through a light sensor 182. Further, the running LED group 186 may be turned off completely depending on what the requirements and/or regulations are for having brake lights and the proximity of brake lights to other running lights.

Depending on the pulse generators 166, 168, 170, 172, the outputs of which are combined through AND gates 188, 190, 192 determined whether the stop LED driver circuit 194, the left turn LED driver circuit 196 or the right turn LED driver circuit 198 are powered. Based thereon, a stop LED group 200, a left hand turn LED group 202 and a right hand LED group 204 may be illuminated. The running LED group 186, the stop LED group 200, the left hand turn LED group 202 and the right hand turn LED group 204 are all part of the illumination display 48 on the helmet 30.

Outputs of each of the driver circuits 184, 194, 196, 198 are also inputs for a system monitored driver circuit 206. The system monitored circuit 206 drives LEDs 208 that are used to create the indicator 74. It is these LEDs 208 that are visible by the person wearing the helmet 30 as to whether each of the LED groups 186, 200, 202, 204 are being illuminated based on the inputs received through the receiver.

The receiving circuit 160 also includes a battery 210. The battery 210 is charged by a battery charger circuit 212 which, in turn, receives power from the generator 78. The generator 78 is being turned by the turbine 80. It should be appreciated by those skilled in the art that the battery charger circuit 212 may also receive an input for a direct power link up with a standard electrical outlet to bypass the need to have the turbine 80 turning for the battery 210 to be charged.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

I claim:

1. A communications assembly adapted for use with a helmet worn by a person riding a vehicle with a light indication system, said communications assembly comprising:
    a control circuit fixedly secured to the helmet;
    an illumination display operatively connected to said control circuit and fixedly secured to a back surface of the helmet, said illumination display emitting light rearward of the helmet;
    a transmitter electrically connected to the light indication system of the vehicle for transmitting signals as a function of a status of the light indication system;
    a receiver electrically connected to said control circuit for receiving the signals transmitted by said transmitter, said receiver forwarding the signals onto said control circuit such that said control circuit operates said illumination display in concert with the light indication system of the vehicle; and
    an indicator electrically connected to said control circuit to indicate to the person of the operation of said illumination display, wherein said indicator includes a plurality of lights fixedly secured to the helmet in a position peripheral to a person's vision.

2. A communications assembly as set forth in claim 1 wherein said transmitter transmits signals in an infrared region of the electromagnetic spectrum.

3. A communications assembly as set forth in claim 2 wherein said transmitter includes a focusing device to direct the signals toward said receiver.

4. A communications assembly as set forth in claim 3 wherein said focusing device defines an aperture.

5. A communications assembly as set forth in claim 4 wherein said focusing device includes an aperture adjuster for adjusting a distance said aperture is from said transmitter.

6. A communications assembly as set forth in claim 1 including
    a generator electrically connected to said control circuit and mounted to the helmet for generating an electrical current to be consumed by said control circuit and said illumination display.

7. A communications assembly as set forth in claim 6 wherein said generator includes a turbine rotatably mounted to the helmet in a position whereby wind rotates said turbine.

8. A communications assembly as set forth in claim 7 including a battery for providing electrical power to said communications assembly.

9. A communications assembly as set forth in claim 8 wherein said generator is electrically connected to said battery.

10. A communications assembly as set forth in claim 1 including
    a retransmitting transmitter fixedly secured to the back surface of the helmet for retransmitting the signals received by said receiver rearward thereof to be received by a passenger helmet positioned behind the helmet.

11. A communications assembly as set forth in claim 10 including a passenger mode switch for turning said indicator off when the passenger helmet is disposed behind the helmet.

12. A communications assembly as set forth in claim 11 wherein said retransmitting transmitter transmits signals in an infrared region of the electromagnetic spectrum.

13. A communications assembly as set forth in claim 12 wherein said retransmitting transmitter transmits signals in the infrared region of the electromagnetic spectrum.

14. A communications assembly as set forth in claim 12 wherein said retransmitting transmitter includes a focusing device to direct the signals toward said receiver.

15. A communications assembly as set forth in claim 14 wherein said retransmitting transmitter includes a focusing device to direct the signals toward said receiver.

16. A communications assembly as set forth in claim 15 wherein said focusing device defines an aperture.

17. A communications assembly as set forth in claim 16 wherein said focusing device includes an aperture adjuster for adjusting a distance said aperture is from said retransmitting transmitter.

* * * * *